US007812976B2

(12) United States Patent
Perry et al.

(10) Patent No.: US 7,812,976 B2
(45) Date of Patent: Oct. 12, 2010

(54) GRAPHICAL USER INTERFACE FOR DIRECTING MULTIPLE FEATURE PROGRAMMING IN A PRODUCTION SYSTEM

(75) Inventors: Thomas J. Perry, Fairport, NY (US); Natasha A. Gitany-Alonso, Mayaguez, PR (US); Robert I. Jacobs, Fairport, NY (US); Albert L. O'Neil, III, Rochester, NY (US); Raju Seetharam, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 1068 days.

(21) Appl. No.: 11/316,766

(22) Filed: Dec. 23, 2005

(65) Prior Publication Data

US 2007/0146784 A1 Jun. 28, 2007

(51) Int. Cl.
*G06F 3/12* (2006.01)
(52) U.S. Cl. .................... 358/1.12; 358/1.15; 358/1.13; 358/1.9; 715/243; 715/273; 715/275; 715/277
(58) Field of Classification Search ................ 358/1.15, 358/1.13, 1.12, 1.9; 715/700, 733, 738, 748, 715/243, 273, 275, 277
See application file for complete search history.

(56) References Cited

U.S. PATENT DOCUMENTS

| | | | |
|---|---|---|---|
| 6,104,470 A | 8/2000 | Streefkerk et al. | |
| 6,614,454 B1 * | 9/2003 | Livingston | 715/781 |
| 6,642,943 B1 * | 11/2003 | Machida | 715/763 |
| 6,873,426 B1 | 3/2005 | Farrell | |
| 6,930,791 B2 | 8/2005 | Jackelen | |
| 6,965,390 B2 | 11/2005 | Alimpich et al. | |
| 7,239,408 B1 * | 7/2007 | Whitmarsh et al. | 358/1.15 |
| 7,609,401 B2 * | 10/2009 | Kujirai et al. | 358/1.13 |
| 2005/0200881 A1 * | 9/2005 | Yamade | 358/1.14 |
| 2006/0088331 A1 * | 4/2006 | Inoue et al. | 399/81 |

\* cited by examiner

*Primary Examiner*—Chan S Park
(74) *Attorney, Agent, or Firm*—Kermit D. Lopez; Luis M. Ortiz; Ortiz & Lopez, PLLC

(57) ABSTRACT

A method for utilizing a graphical user interface for concurrent programming of multiple feature operations to a single production job in a controller for a production system includes presenting options on the user interface for the selection of job properties or queue properties, with queue properties defined as default values for the virtual device to which the job will be submitted and job properties defined as job feature selection options. The job feature selection options may be hidden or displayed to enable the selection of valid job feature combinations only. Toggle controls are utilized for job feature options whose operation is limited by previously selected job feature options. The application of any valid combination of selected job feature options on the completed production job is illustrated on a dynamic graphic.

7 Claims, 11 Drawing Sheets

GRAPHICAL USER INTERFACE FOR DIRECTING MULTIPLE FEATURE PROGRAMMING IN A PRODUCTION SYSTEM

BACKGROUND AND SUMMARY

This disclosure relates generally to the control of feature programming in a production system and more particularly to a graphical user interface system and method utilized by system controllers, job submission utilities, and finishing equipment for concurrently applying multiple feature operations to a single production job.

Various methods have long been used to prepare printed material in a final or finished state for a user of the material. Such finishing techniques include folding, binding, stapling, excess paper trimming, hole drilling and the like. In earlier times, the printing and finishing steps were accomplished independent of each other. In such cases, the completed print jobs, consisting of a plurality of discrete groups of associated output sheets, are typically marked with a file or other identifier used to alert a finishing operator to the desired finishing for the print job.

Increasingly today printers are fitted with finishing terminals capable of providing more than one finishing option to a job, for example, to both hole punch and staple the output pages. Previously, such options were mutually exclusive; the device could either staple or fold the output but could not do both. On such devices, separate user interface controls are utilized to enable each option. When multiple options are enabled in a single device, separate controls become inefficient and result in the programming of conflicting finishing operations. These conflicts often are not detected until the device attempts to complete the print job, resulting in delays and rework associated with faulted jobs.

There is no existing method for multiple finishing options that can be programmed concurrently for use when a variety of finishing options are available through a system controller, submission utility or finishing device. Therefore, what is needed is a method that allows a user of a document production system to select among multiple finishing options that may be selected on a concurrent basis to avoid conflicting selections. For the reasons stated above, and for other reasons stated below which will become apparent to those skilled in the art upon reading and understanding the present specification, there is a need in the art for a method of allowing a user of a document production system to select among multiple finishing operations and schedule them from a single interface concurrently.

All U.S. patents and published U.S. patent applications cited herein are fully incorporated by reference. The following patents or publications are noted:

U.S. Pat. No. 6,104,470 to Streefkerk et al. ("Printing System and Control Unit Utilizing a Visual Representation of a Sheet or Document for Selecting Document-Finishing Operations") describes a printing system including a control unit having a display unit for displaying a visual representation of a sheet or document with more than one selectable document-finishing operation. The adaptable visual representation is provided with selection areas that represent selectable document-finishing operations. A document-finishing operation can be selected by activating an associated selection area. The visual representation of the sheet or document is continuously adapted or updated to reflect a newly selected document-finishing operation. However, while Streefkerk provides identification of finishing options not available from a particular finishing device, he does not apply rules to identify which finishing option locations are valid for a succession of finishing operations to be concurrently applied to a single document. Additionally, rather than presenting the user with a clear listing of finishing operations and their associated valid locations, the user interface utilizes symbolic representations which may not be intuitive to all users.

U.S. Pat. No. 6,873,426 to Farrell ("Method and Apparatus to Provide Alternate or Abstract Finishing to a Print Job") describes a printing system providing literal finishing and abstract finishing to a print job. The printing system includes a user interface for supplying print job information including desired finishing instructions. A finishing element applies a finishing operation to a print job, and a processor is in communication with both the user interface and the finishing element. The processor determines compatibility between the finishing element and the desired finishing instruction and upon determining incompatibility, selects a compatible finishing instruction for the finishing element. The compatible finishing instruction may be either a literal finishing operation available on the printing system, or an abstract finishing operation, such as insertion of slip sheets or marking separators between compilation boundaries of a print job with data including machine-readable code or human-readable code indicative of the desired final finishing operation. However, Farrell provides only a means to identify finishing capabilities that are not available on a particular printer/finisher device; it does not provide the capability for concurrent programming of multiple finishing operations.

U.S. Pat. No. 6,930,791 to Jackelen ("Method for Selecting a Finishing Device for Digital Printing") teaches a method for selecting finishing devices to perform finishing operations on a print run. In operation, the printing device selects a finishing device that can perform all demands and a maximum number of suggestions. The suggested finishing operations are stored in a memory of the printing device and may be defaults or entered by a printer operator. Upon selecting the finishing device, the printing device directs the print run to the selected finishing device for processing. Jackelen is directed to selected to selecting a finishing device to be utilized for a particular job based on the capabilities of the device and does not provide capability for concurrent multiple finishing operation programming.

U.S. Pat. No. 6,965,390 to Alimpich et al. ("Method, System, and Program for Selecting Devices to Use to Execute Selected Tasks in a Graphical User Interface") teaches a data processing controlled display system for the interactive display and control of a hierarchical tree of elements or objects in which multiple tree views are presented to the user. The objects in the views are selectable to display detail views of the objects, particularly attributes of the child objects of the selected parent object. The multiple tree views may be of different portions of the same tree or of different trees. The tree views are thus available for side-by-side comparison. The disclosed embodiments provide examples of improved solutions to the problems noted in the above Background discussion and the art cited therein. Alimpich et al. enables the selection of a particular device based on operative and available functionality, but does not provide for concurrent multiple operation programming of operations.

The disclosed embodiments provide examples of improved solutions to the problems noted in the above Background discussion and the art cited therein. There is shown in these examples an improved method for utilizing a graphical user interface in a controller for a production system for concurrent programming of multiple feature operations to a single production job. The method includes presenting options on the user interface for the selection of job properties or queue properties, with queue properties defined as default values for the virtual device to which the job will be submitted and job properties defined as job feature selection options. The job feature selection options may be hidden or displayed to enable the selection of valid job feature combinations only. Toggle controls are utilized for job feature options whose operation is limited by previously selected job feature options. The application of any valid combination of selected job feature options on the completed production job is illustrated on a dynamic graphic.

In another embodiment there is provided a production system controller having a display in the form of a graphical user interface for concurrent programming of multiple feature operations to a single production job. The graphical user interface presents options for the selection of job properties or queue properties, with queue properties defined as default values for the virtual device to which the job will be submitted and job properties defined as job feature selection options. Job feature selection options may be hidden or displayed to enable the selection of valid job feature combinations only. Toggle controls are utilized for job feature options whose operation is limited by previously selected job feature options. The application of any valid combination of selected job feature options on the completed production job is illustrated on a dynamic graphic.

In another embodiment there is provided a document production device utilizing a graphical user interface to program document finishing operations. The graphical user interface causes the document production device to perform method steps for concurrent programming of document finishing operations to a single production job. The method includes presenting options on the user interface for the selection of job properties or queue properties, with queue properties defined as default values for the virtual device to which the job will be submitted and job properties defined as job feature selection options. To enable the selection of only valid job feature combinations, various job feature selection options may be hidden or displayed. Toggle controls are utilized for job feature options whose operation is limited by previously selected job feature options. The application of any valid combination of selected job feature options on the completed production job is illustrated on a dynamic graphic.

In yet another embodiment there is provided a computer-readable storage medium having computer readable program code embodied in the medium. When the program code is executed by a computer, the program code causes the computer to perform method steps for concurrent programming of multiple feature operations to a single production job. The method includes presenting options on the user interface for the selection of job properties or queue properties, with queue properties defined as default values for the virtual device to which the job will be submitted and job properties defined as job feature selection options. The job feature selection options may be hidden or displayed to enable the selection of valid job feature combinations only. Toggle controls are utilized for job feature options whose operation is limited by previously selected job feature options. The application of any valid combination of selected job feature options on the completed production job is illustrated on a dynamic graphic.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

Figure 1:
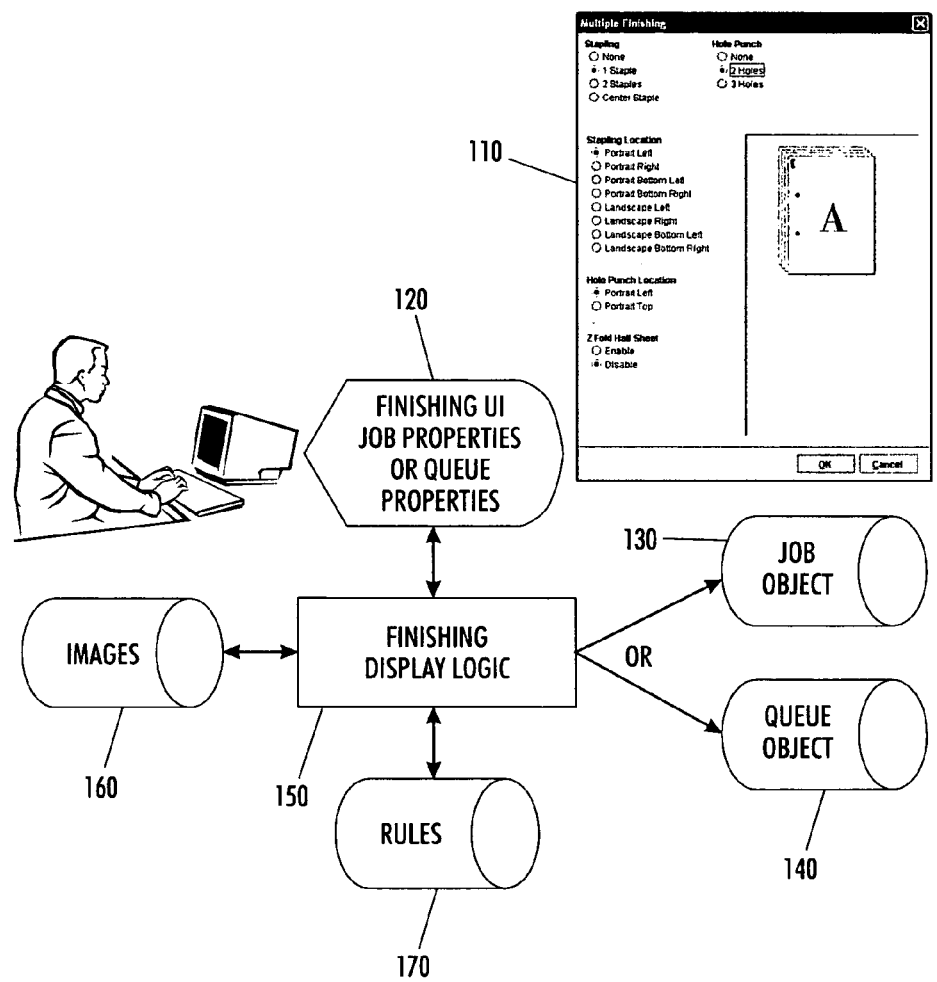
FIG. 1 is a functional block diagram of one embodiment of the concurrent multiple feature programming user interface.

In the following detailed description, reference is made to the accompanying drawings, which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the disclosure. The following detailed description is, therefore, not to be taken in a limiting sense.

The method and system for utilizing a user interface described herein provides the capability for selecting multiple features simultaneously with intelligent checking that disables or eliminates conflicting feature options from being selected during the programming process. While for the purposes of explanation the user interface will be described as functioning within a document production system to direct finishing operations, it will be appreciated by those skilled in the art that the user interface may be beneficially utilized in any production environment which requires the concurrent programming of multiple features with many possible feature combinations being invalid. All such variations and modifications are fully contemplated by the scope of the specification and claims herein. For the case of a document production system in which multiple finishing options are scheduled concurrently, the user interface presents available finishing options in a multiple finishing dialog. Finishing options are hidden or shown to enable only valid combinations based on finishing option location control for a document. Controls for finishing options whose location is fixed by other options, for example, folding is constrained to be on an edge opposite the edge used for stapling or hole punching, are presented as on/off toggles. A dynamic graphic is utilized by the user interface to illustrate the application of any valid combination of options on the printed output document, providing immediate feedback to the user on the effect of finishing selections, with the output shown in "natural reading orientation".

Various computing environments may incorporate capabilities for supporting document production capabilities utilizing printing system controllers, print submission utilities and finishing equipment on which the multiple finishing option user interface may reside. The following discussion is intended to provide a brief, general description of suitable computing environments in which the method and system may be implemented. Although not required, the method and system will be described in the general context of computer-executable instructions, such as program modules, being executed by a single computer. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

The method and system may also be practiced in distributed computing environments where tasks are performed by remote processing devices that are linked through a communication network. In a distributed computing environment, program modules may be located in both local and remote memory storage devices.

Referring to FIG. 1, the functional block diagram illustrates an example embodiment of the multiple finishing user interface. When a user accesses the multiple finishing user interface at 120, the user interface provides options for the selection of job properties or queue properties, with queue properties defined as the default values for the virtual printer (queue) to which the job is submitted. This is illustrated by sample display 110, which presents stapling, hole punch, stapling location, hole punch location, and Z fold half sheet options as well as a dynamic graphic of the document "A" showing the finishing options selected. The features of this display will be discussed more fully herein below with respect to FIGS. 6-10.

Finishing display logic module 150 receives information as to finishing selections made by the user through user interface 120 and checks selections against the rules provided in rules module 170 for the current configuration to determine what additional options should be made available to the user via the user interface 120. Any selections are also provided to the images module 160 in order to retrieve the proper graphics for display in the user interface 120. The graphics presenting the mimic of how the job will be finished can be in the form of bitmaps or vector graphics. Finishing display logic module 150 saves the programming to either the job object module 130 or queue object module 140. The job object module 130 consists of a data structure composed of attribute-value pairs for each job-programming feature. In the queue properties context, the finishing programming is saved to the queue object module 140, which consists of a data structure composed of attribute-value pairs for each of the default values for the virtual printer to which the job is submitted. When job or queue properties is first opened and displayed on the user interface, the display logic module 150 retrieves the saved values for all attributes from the job or queue object modules and composes the display for presentation to the user.

Users can access the graphical user interface by any known means, for example through a workstation dedicated to the printer, from a personal desktop via a remote user interface, or via an Internet print submission. The computers typically have a processor, random-access memory, read-only memory, and one or more storage devices, such as a hard drive, CD-ROM, DVD, diskette, etc., as well as an interface to network printing capability. The processor is coupled to an output device, such as a display device, input devices, such as a keyboard, mouse, or pointer, and communication circuitry. The output device, for example a monitor, displays information for viewing by a user of the computer and the input device is used to control a screen pointer provided by the graphical user interface of the operating system.

The computers and printing capability are coupled together and communicate via a network. In one embodiment, the computer includes a modem and corresponding communication drivers to connect to the Internet via what is known in the art as a "dial-up connection". In another embodiment, the computers are coupled together in only a local-area network (LAN). In yet another embodiment, the computers include an Ethernet or similar hardware card to connect to the local-area network that itself is connected to the Internet via what is known in the art as a "direct connection". In further embodiments, the computer may be connected to the Internet using a cable modem or satellite Internet connectivity.

The system and method herein are not limited to a particular type of network system to which the computers are connected. Typical network interfaces include general-purpose systems such as POTS (plain-old telephone systems) and ISDN (Integrated Services Digital Network), as well as special-purpose systems such as a LAN (local-area network) or a WAN (wide-area network). Such networking environments are commonplace in offices, enterprise-wide computer networks, intranets and the Internet. Those skilled in the art will appreciate that the principles of the system and method described herein can be applied to virtually any network system without departing from the scope of the claims and specification.

Figure 3:
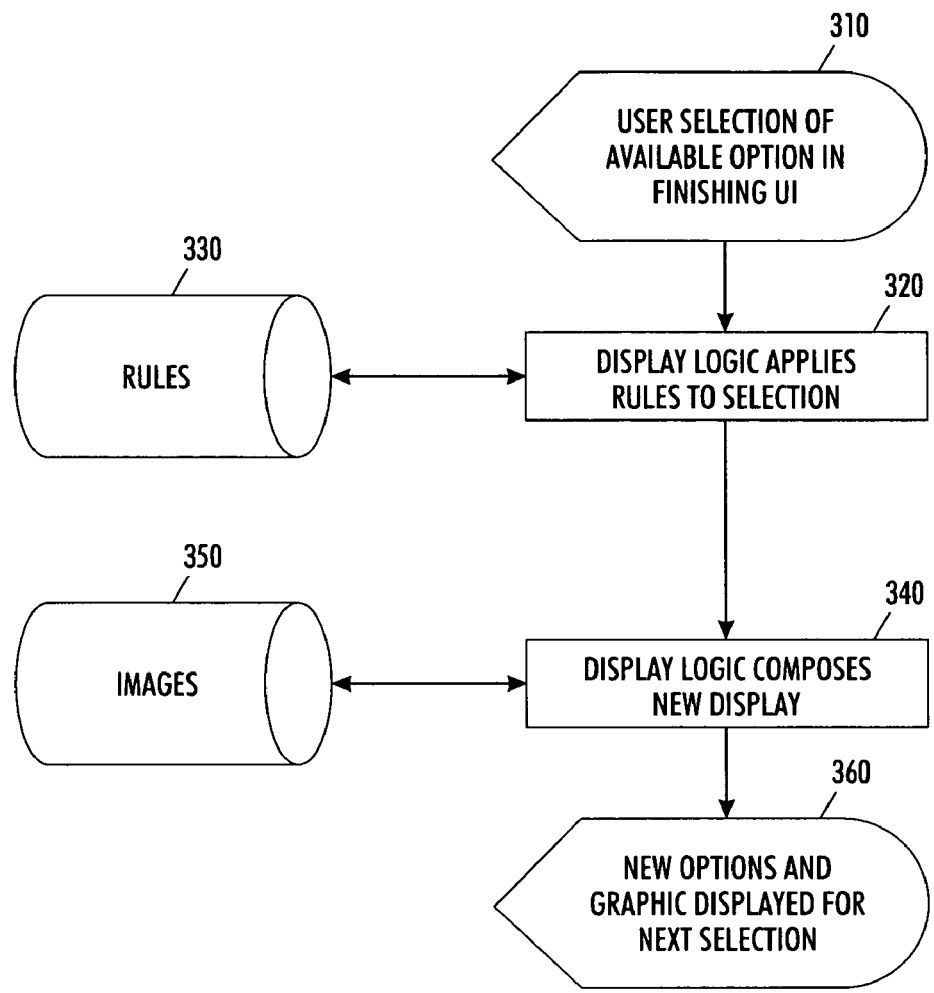
FIG. 3 is a functional block diagram of the interaction detail for the embodiment of the concurrent multiple feature programming user interface of FIG. 1.
Figure 4:
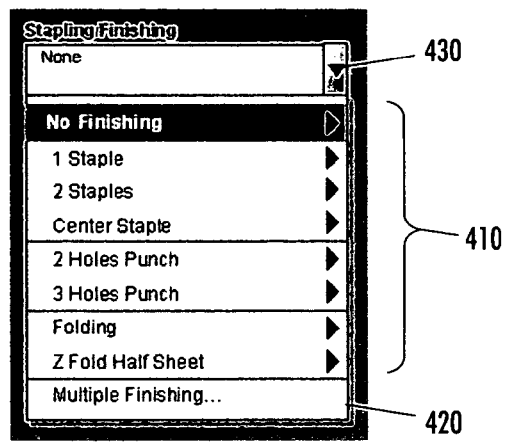
FIG. 4 illustrates an example embodiment of a finishing option availability display in accordance with the method for directing multiple finishing operations in a document production system.

Turning now to FIG. 3, there is shown a more detailed description of the operation of the finishing display logic module presented hereinabove. For the purposes of this embodiment, the finishing display logic module includes operations 320 and 340. When a user selects an available option in the finishing user interface at 310, the display logic module provides this information to rules module 330, which applies rules to the selection to determine what valid location options are available for selection by the user. These options are then returned to the display logic module at 320. The rules module allows this feature to support different machines of different configurations. The display logic module then provides information about the user selection to images module 350, which composes a mimic and returns it to the display logic module at 340, for composition of a new display. Updated finishing options and a new dynamic graphic are then displayed for the next finishing selection at 360.

Turning now to FIGS. 2 and 4-7, there is illustrated one embodiment of the method for selecting multiple finishing options concurrently on a user interface. The user of a device communicating with a print system selects finishing functionality on the user interface of the device, which may be accomplished through a touch pad, touch screen, buttons, selection of an icon, or a keypad at 210. The user interface then displays a listing, illustrated in FIG. 4, to enable the user to select among the options of applying no finishing options 430, mutually exclusive selections 410, as well as multiple finishing capability 420. Mutually exclusive selections 410 may include (but are not limited to), for example, a single staple, two or more staples, a center staple, two holes punched, three holes punched, folding or a Z fold half sheet. Multiple finishing option 420 enables application of more than one type of finishing operation to a job, for example, applying both stapling and hole punching to a single job.

Figure 5:
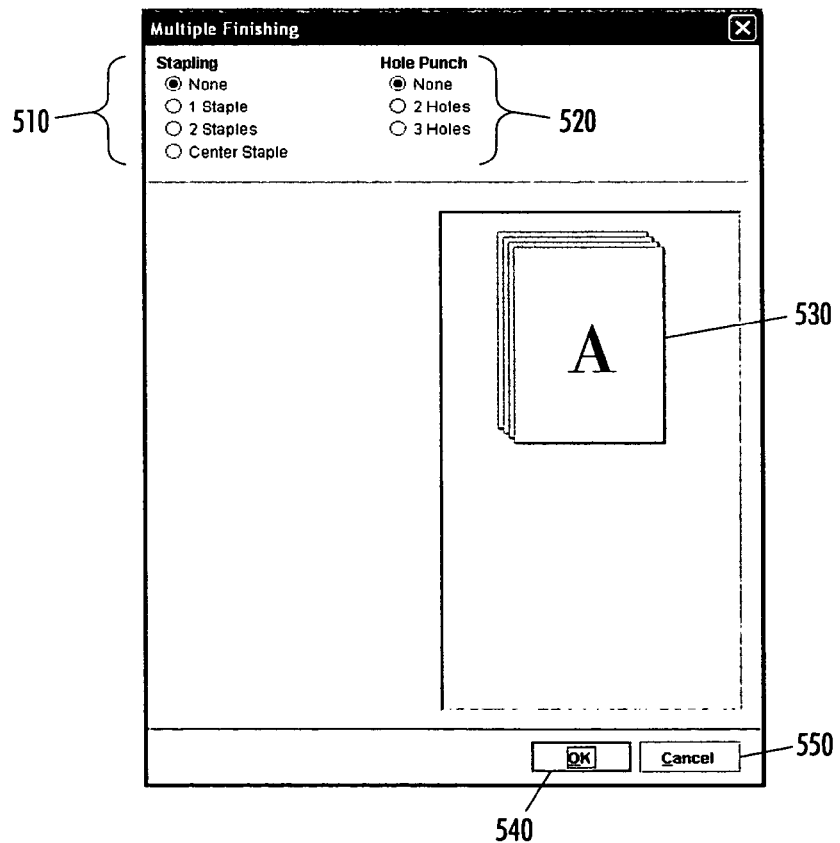
FIG. 5 illustrates an example embodiment of a dynamic graphic display for presenting the application of finishing option combinations on document output.

When the multiple finishing option is selected at 220, the user interface displays a multiple finishing dialog screen at 225, with all finishing options off. This default graphic is illustrated in FIG. 5, which shows both stapling options 510 and hole punch options 520 as being off. Dynamic graphic 530 shows the output of the selected finishing options in natural reading orientation as the options are selected. In FIG. 5, since no options have yet been selected, dynamic graphic 530 shows a document or job with no finishing options applied. When the user selects a first finishing option at 230, the user interface presents the valid location selections for the first finishing option at 235.

Figure 6:
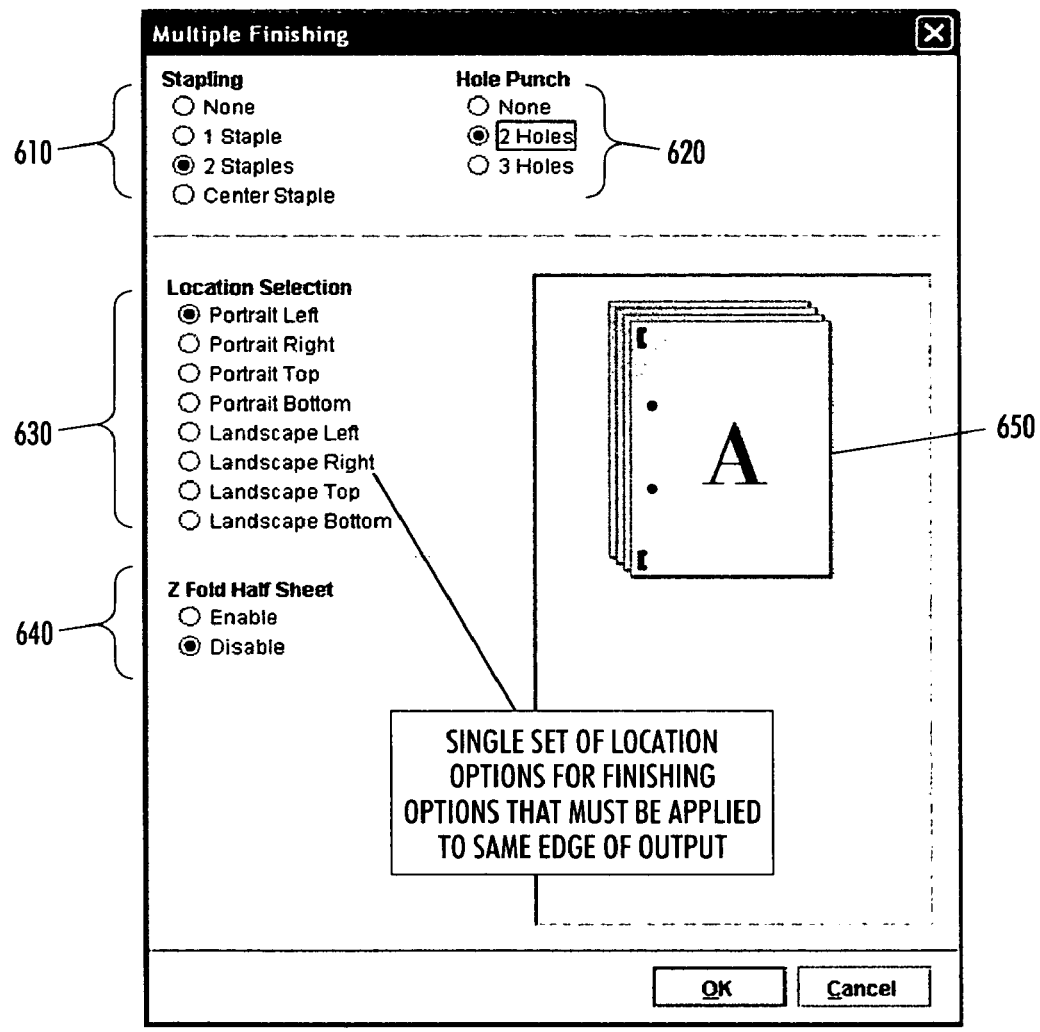
FIG. 6 illustrates an example embodiment of a dynamic graphic display for presenting same edge document finishing options.
Figure 7:
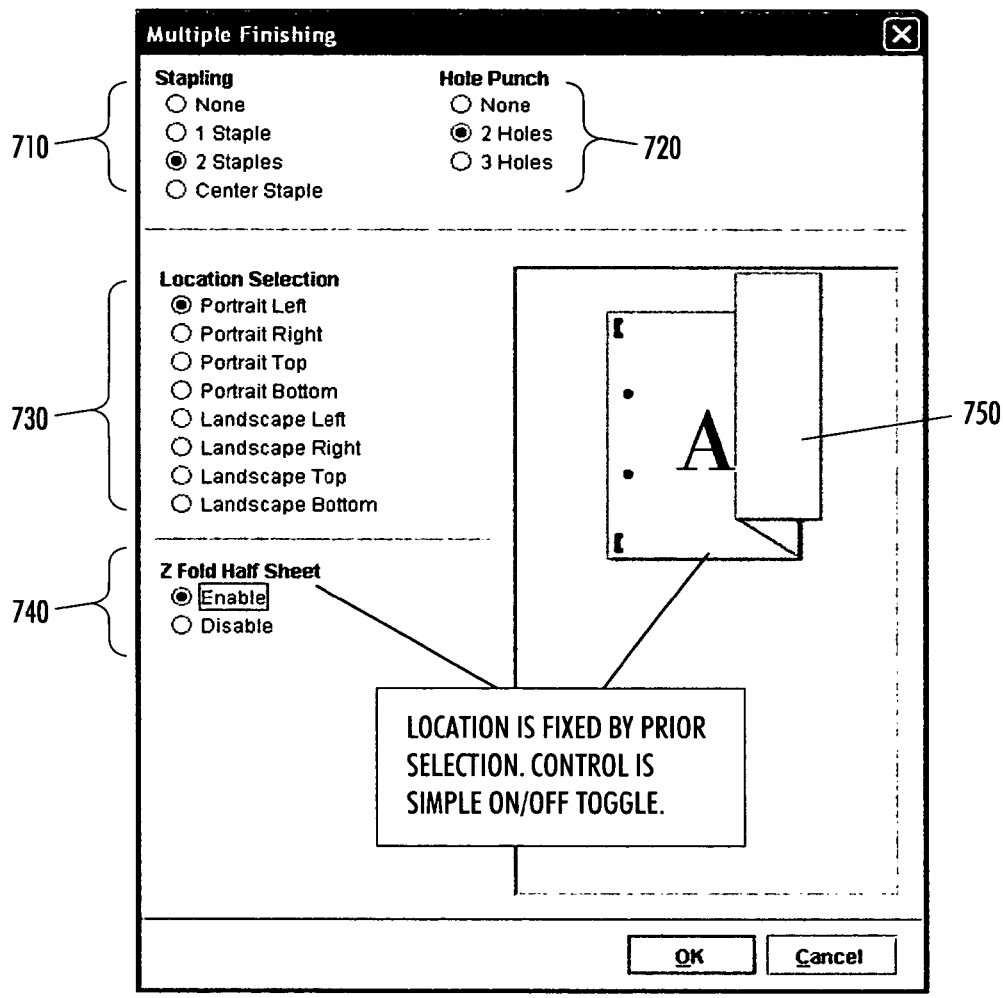
FIG. 7 illustrates another example embodiment of a dynamic graphic display for presenting same edge document finishing options.

This is illustrated in FIGS. 6-7, which show one embodiment of the selection of multiple finishing options to a document or job in which the options which must be applied to the same edge of the output are perfectly constrained and can be presented together. In FIG. 6, stapling options 610 and hole punch options 620 are shown with location selection options 630. Since these options must be applied to the same edge of the output document, they are perfectly constrained and can be presented together. Toggle (On/Off) controls are displayed for any options whose location is fixed relative to the other options (for example, Z fold half sheet options 640 can only be applied to the opposite long edge of the document illustrated in FIGS. 6 and 7). In this example illustration, the two staples option has been selected from among stapling options 610.

Figure 2:
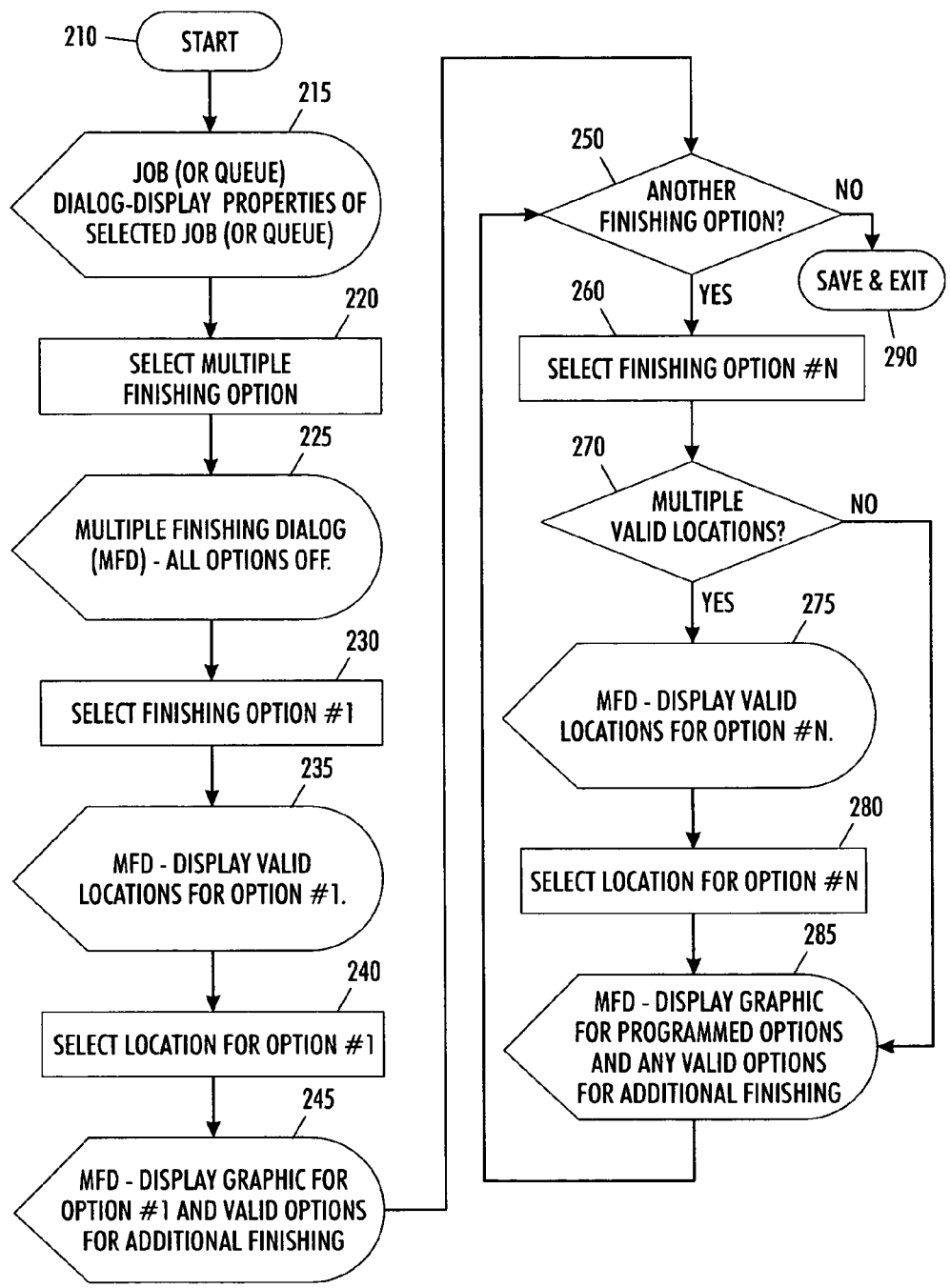
FIG. 2 is a flow chart illustrating a one embodiment of a method for selecting multiple finishing options concurrently on a user interface.

In FIG. 2 at 240 the user selects a location for application of the finishing option to the job from among the location selections 630. In this illustration, since portrait left has been selected from among the location selection options 630, at 245 two staples are shown on the dynamic graphic 650 as shown in FIG. 6. The user interface then checks on whether another finishing option is to be applied at 250. If another finishing option is not to be selected, the finishing instructions are saved and the user interface is exited at 290. The user may select another finishing option at 260, as shown in FIG. 6, in which two holes has been selected from the hole punch options 620. The user interface then determines at 270 whether the additional finishing option has more than one valid location option.

If the additional finishing option at 270 has only one valid location (that is, the location is perfectly constrained by prior finishing selections), then at 285 the user interface displays the dynamic mimic for the programmed options and any valid options for additional finishing as shown in FIG. 7. Since the options for both stapling and hole punch must be applied to the same edge of the output document, a single set of location options is presented in FIG. 6 at 630. Since portrait left has been selected from among location selections 630 in this example illustration, the dynamic graphic 650 shows both a two-hole punch and two staples on the left side of the output document.

In the illustrative example of FIG. 7, stapling options 710, hole punch option 720, and location selection 730 remain as illustrated with respect to FIG. 6. However, in the example of FIG. 7, Z fold half sheet option 740 has been enabled. Because the location of this option is fixed relative to the prior finishing selection, only a toggle (Enable/Disable) is provided by the user interface. With selection of the Z fold half sheet enable toggle, the dynamic graphic display 750 shows the finished document with a two hole punch, two staples and a Z fold half sheet along the right edge of the portrait document. The user continues selecting finishing options as described with respect to method steps 250 through 285 of FIG. 2 until all desired finishing options have been programmed. The programmed options are then saved and the user interface is exited at 290.

Figure 9:
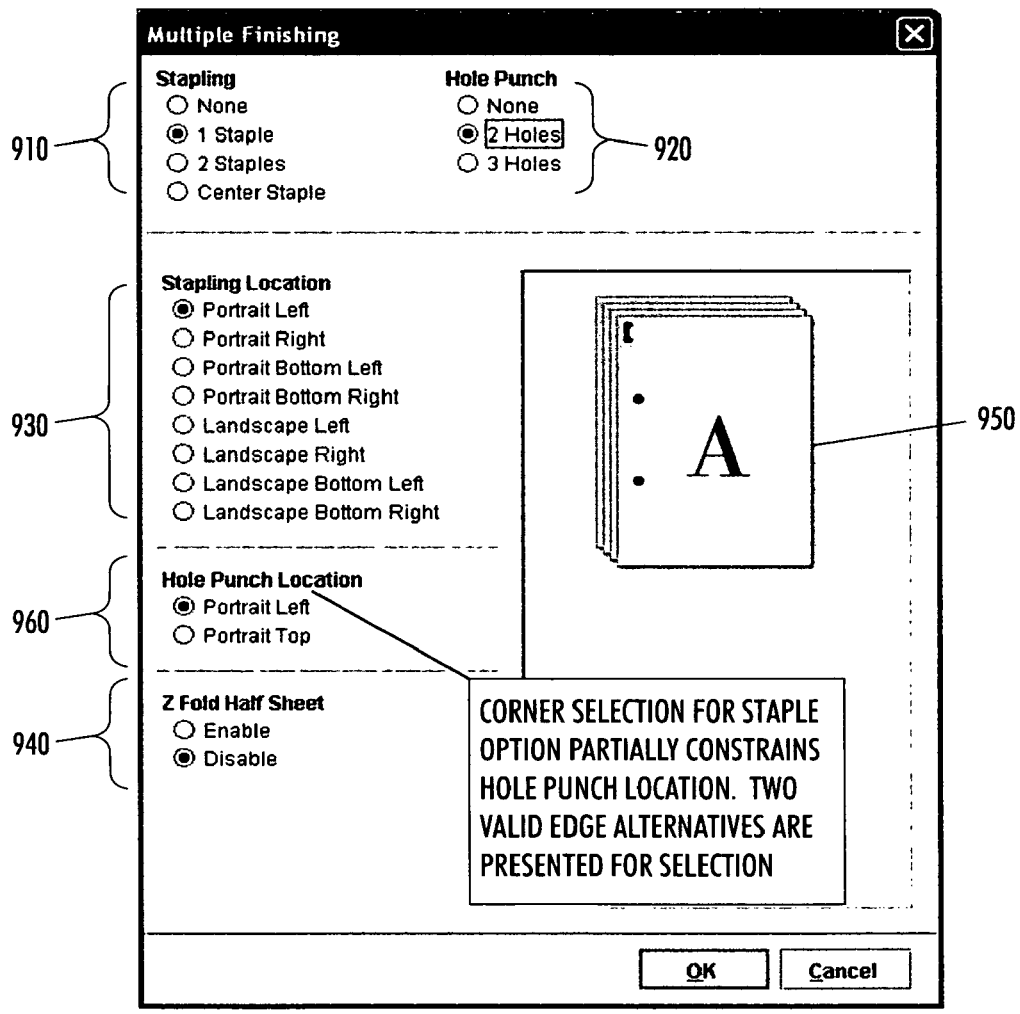
FIG. 9 illustrates an example embodiment of a dynamic graphic display for presenting partially constrained document finishing options.

If the additional finishing option at 270 in FIG. 2 has more than one valid location option, at 275 the user interface displays valid location options for the additional finishing option (as shown in FIG. 9). At 280 a location for the application of the second finishing option is selected. At 285 the user interface displays both the dynamic graphic for the programmed options and any valid options for additional finishing.

Figure 8:
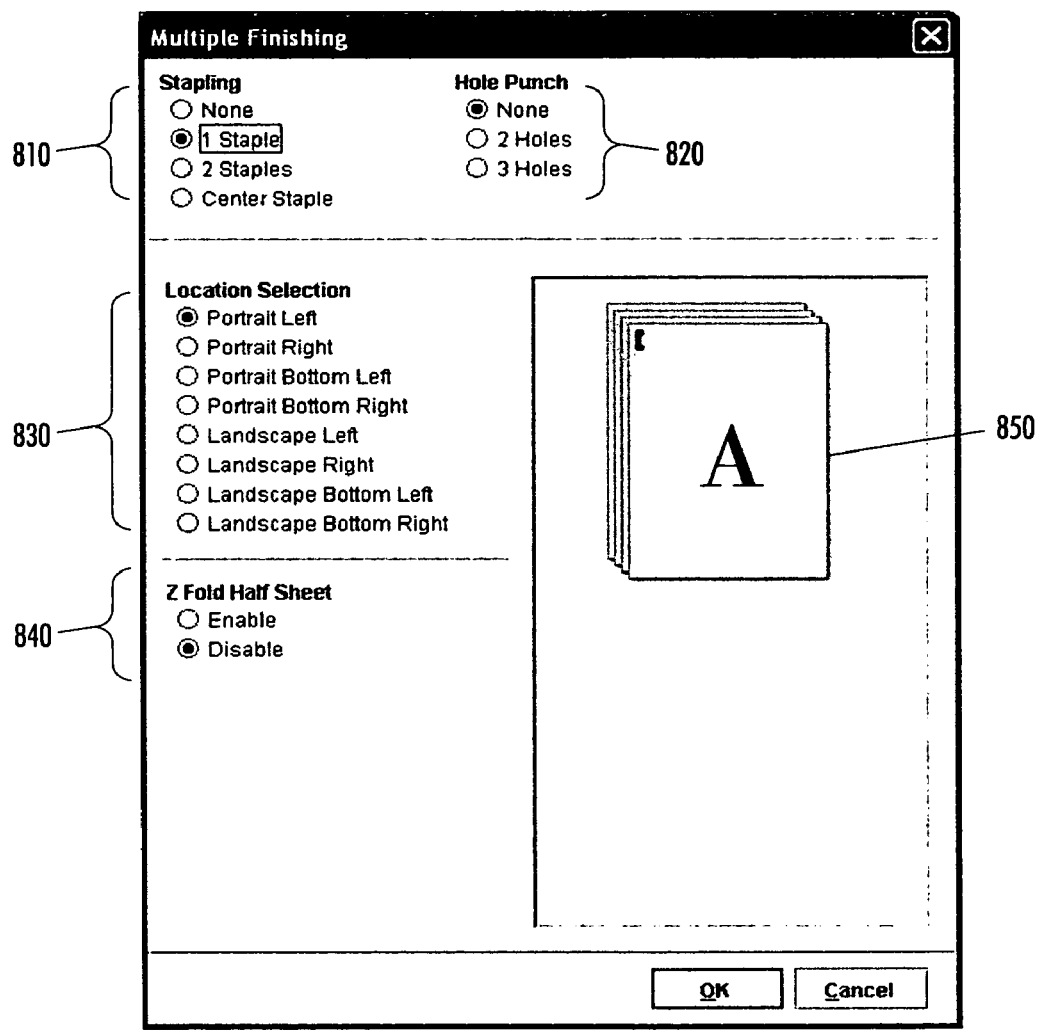
FIG. 8 illustrates an example embodiment of a dynamic graphic display for presenting corner location document finishing options.
Figure 10:
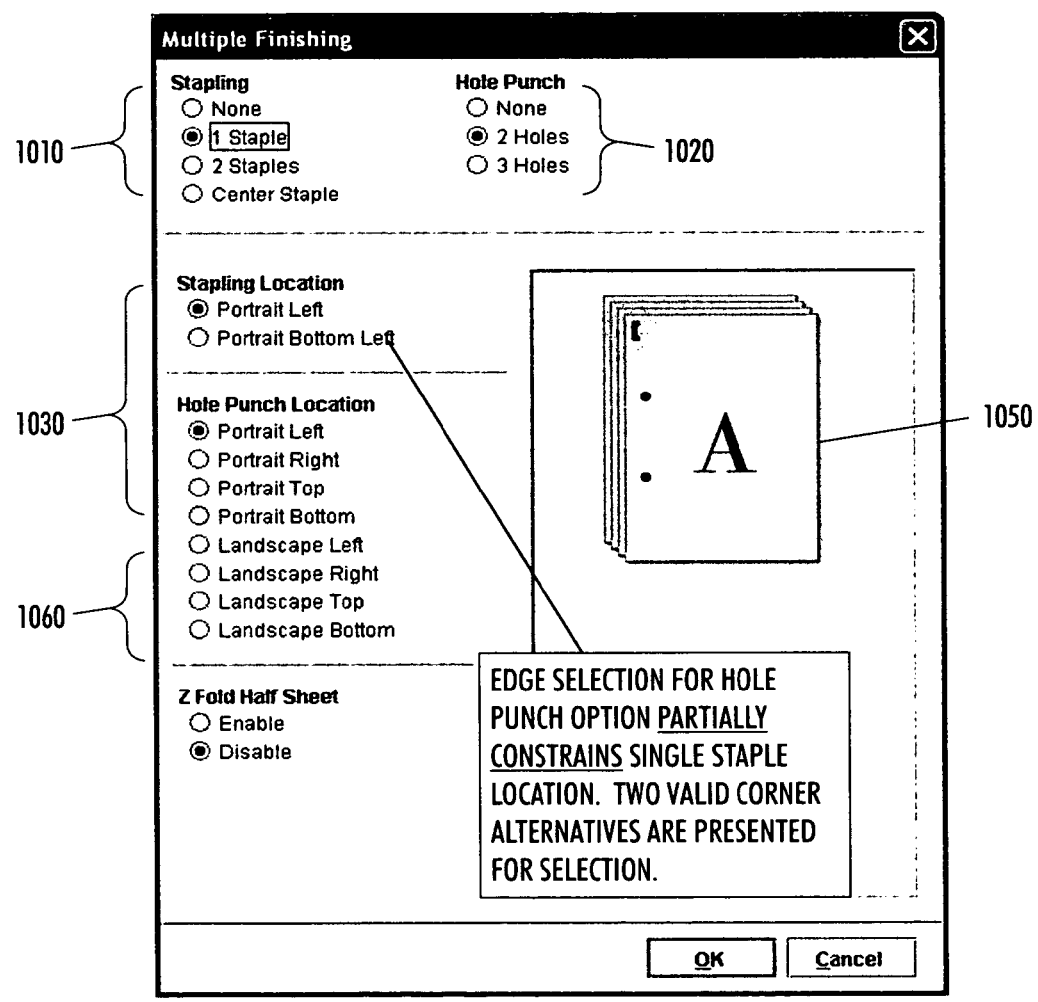
FIG. 10 illustrates another example embodiment of a dynamic graphic display for presenting partially constrained document finishing options.

Turning now to FIGS. 8-10, a single staple and two-hole punch combination are illustrated. FIG. 8 illustrates a display of the user interface showing corner location document finishing options. In this example embodiment, one staple has been selected from stapling options 810 and no options have been selected from among hole punch options 820. Since a single staple may be applied to any corner of the output document, all location selections 830 are supported, from which portrait left has been selected. This selection is illustrated in dynamic graphic 850, which shows the presence of a staple in the upper left corner of the finished document. Z fold half sheet options 840 have been disabled for the purposes of this example.

After a corner is selected, the location for other finishing options applied to an edge is partially constrained, since two edges define a corner. In this example, with a single staple applied to the top left corner, hole punching can be applied to either the left edge or the top edge. Only valid alternatives are presented for selection, as illustrated in FIG. 9. FIG. 9 shows one staple selected from among stapling options 910 and two holes selected from hole punch options 920. Previously selected portrait left stapling location has been selected from among stapling location options 930. Because hole-punch locations are partially constrained by the location of the corner staple, hole punch location options 960 include the valid edge alternatives, portrait left and portrait top. Dynamic graphic display 950 shows the portrait left stapling location selection with the portrait left hole punch location selection.

Alternatively, if the hole-punch finishing option had been selected prior to the staple finishing option, the user interface would have presented the constraints as applied to the stapling operation, as illustrated in FIG. 10. In this example embodiment, two holes punched has been selected from among the hole-punch options 1020 and portrait left has been selected from among hole-punch location options 1060. One staple was then selected from among stapling options 1010. Because the edge selection for the hole-punch option partially constrains the location for a single staple, only two valid corner alternatives are presented for selection in stapling location options 1030. Dynamic graphic display 1050 shows the portrait left hole punch selection with the portrait left corner stapling location selection.

Figure 11:
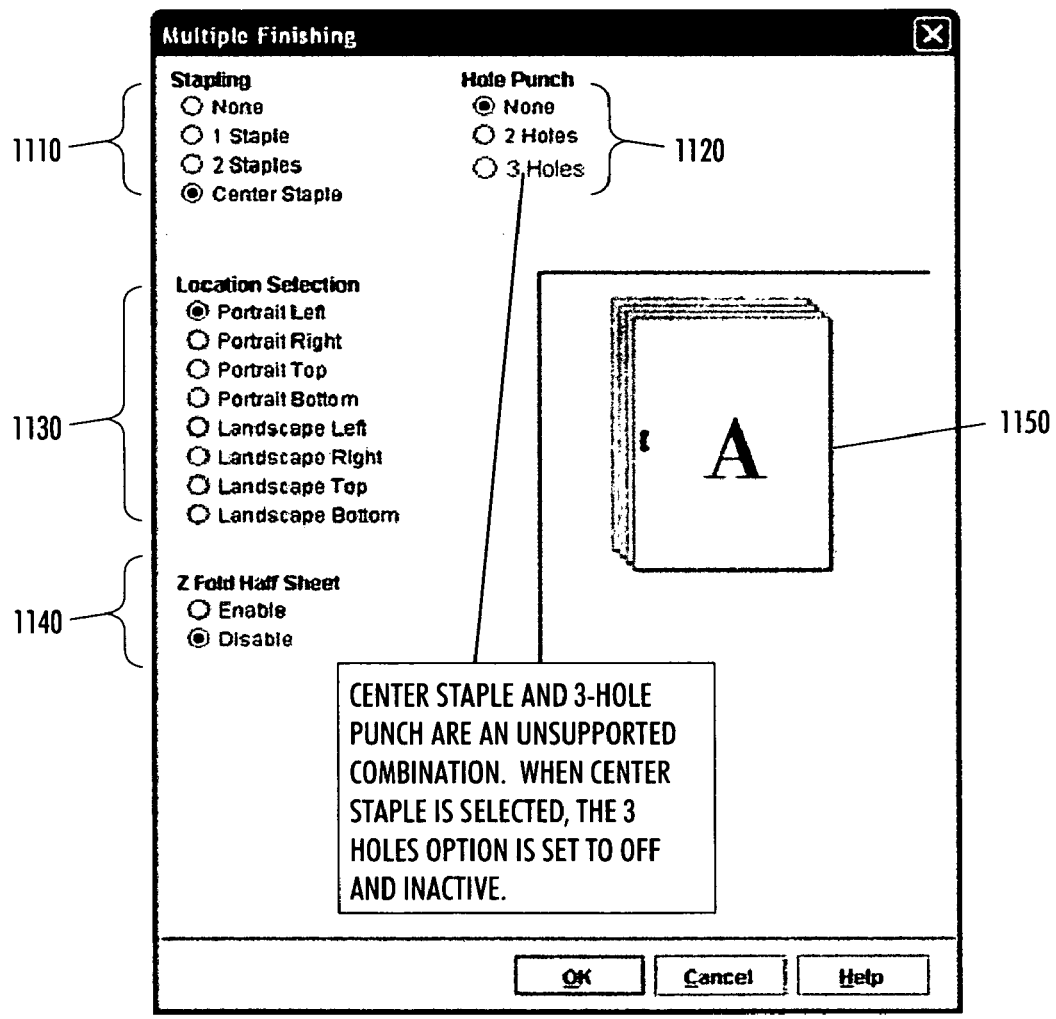
FIG. 11 illustrates an example embodiment of a dynamic graphic display for presenting unsupported document finishing option combinations.
Figure 12:
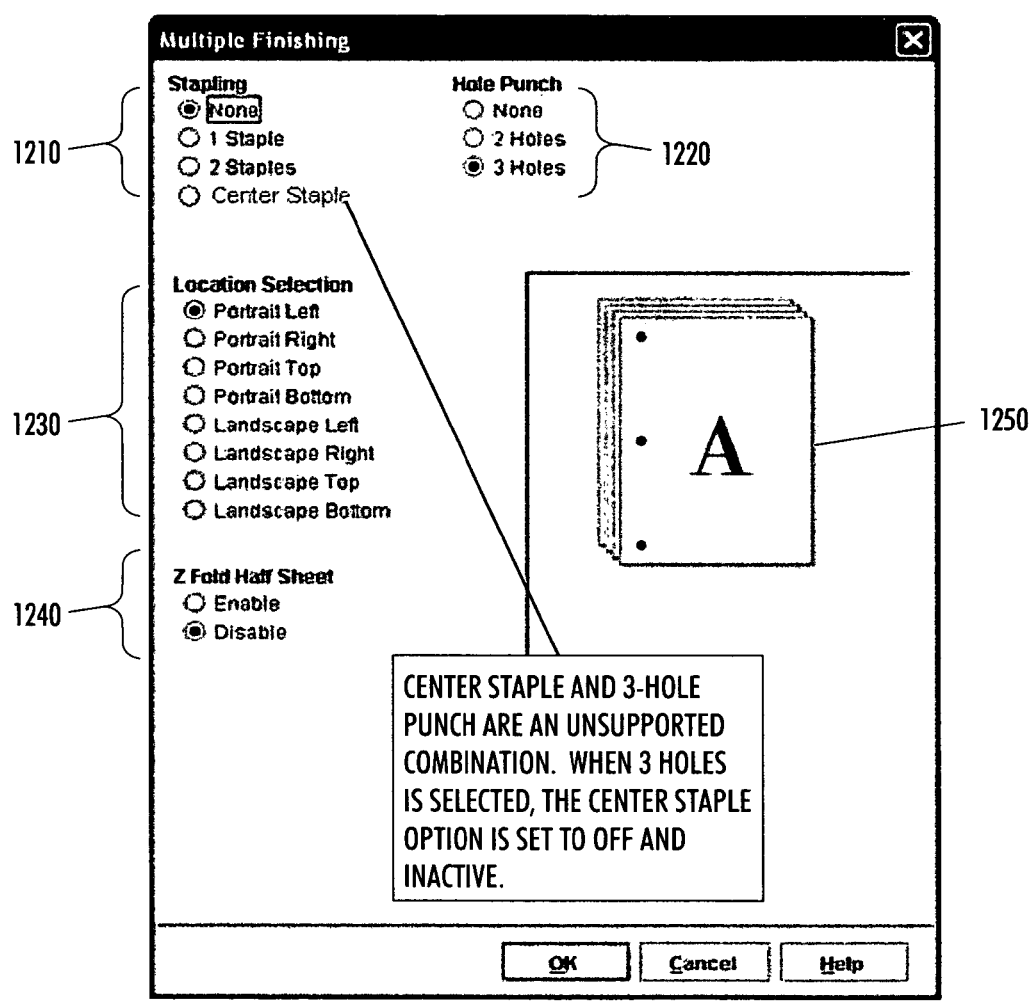
FIG. 12 illustrates another example embodiment of a dynamic graphic display for presenting unsupported document finishing option combinations.

Some combinations of feature options may be unsupported by the hardware, as illustrated in FIGS. 11 and 12. Turning to FIG. 11, the combination of center staple and three-hole punch are an unsupported combination. In this example embodiment, center staple has been selected from among stapling options 1110. When center staple is selected, the three-hole punch option is set to off and is inactive (not selectable) among hole punch options 1120. Location selection options 1130 provide for the selection of portrait left for the center staple location. Dynamic graphic display 1150 illustrates the application of the center staple finishing option to the completed document or job. For the purposes of the discussion of this embodiment, the Z fold half sheet option 1140 has been disabled, but could be toggled to the enable function.

Correspondingly, in FIG. 12 three-hole punch has been selected from among hole-punch options 1220. Because center staple and three-hole punch are an unsupported combination, when three-hole punch is selected, the center staple option within the stapling options 1210 is set to Off and Inactive (not selectable). Portrait left has again been selected from among location selection options 1230 and the dynamic graphic display 1250 shows the finished document with the three-hole punch option applied. For the purposes of the discussion of this embodiment, the Z fold half-sheet option 1240 has been disabled, but could be toggled to the enable function.

While the method has been described with reference to a user interface having buttons, a touch screen, or icons to make selections and perform operations, it will be appreciated by one skilled in the art that the method may be practiced by a series of screen prompts through the user interface, which is fully contemplated by the specification and scope of the claims herein.

While the present discussion has been illustrated and described with reference to specific embodiments, further modification and improvements will occur to those skilled in the art. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device that stores, processes, routes, manipulates, or performs like operations on data. It is to be understood, therefore, that this disclosure is not limited to the particular forms illustrated and that it is intended in the appended claims to embrace all alternatives, modifications, and variations that do not depart from the spirit and scope of the embodiments described herein.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. In a controller for a production system, wherein the controller includes a display in the form of a graphical user interface, a method for concurrent programming of multiple feature operations to a single production job, the method comprising:

presenting options for a concurrent selection of job properties or queue properties on a graphical user interface, wherein said graphical user interface functions within a document production system to direct document finishing operations, wherein said queue properties include default values for a virtual device to which the job will be submitted, and wherein said job properties include job feature selection options comprising all said finishing operations supported by said document production system;

presenting said job feature selection options on the graphical user interface that are available, wherein said job feature selection options display only valid job feature combinations;

providing toggle controls on the graphical user interface for job feature options whose operation is limited by previously selected job feature options;

presenting valid location selections for a first finishing option selection;

providing a dynamic graphic to illustrate an application of said first finishing option selection for a completed document;

checking against rules controlling finishing option combinations;

applying said rules to said first finishing option selection to determine which valid finishing options are available as second finishing option selections;

presenting said valid second finishing option selections on said user interface;

presenting valid location selections for said second finishing option selection to be applied to said completed document;

applying said rules to said second finishing option selection to determine which valid finishing options are available as further finishing option selections;

providing a dynamic graphic to illustrate the application of said first finishing option selection and said second finishing option selection on the completed document;

repeating presenting valid further finishing option selections on said user interface, presenting valid location selections for said further finishing options selections, applying said rules, and providing a dynamic graphic until all finishing selections have been completed; and presenting combinations of finishing options that are unsupported by the finishing equipment as being inactive.

2. The method for concurrent programming utilizing a graphical user interface according to claim 1, wherein presenting valid location selections includes identifying finishing options which are completely constrained by location limitations of combined finishing options.

3. The method for concurrent programming utilizing a graphical user interface according to claim 1, wherein presenting valid location selections includes identifying finishing options which are partially constrained by location limitations for specific finishing options wherein partially constrained finishing options may be applied to at least two edges of said completed document.

4. The method for concurrent programming utilizing a graphical user interface according to claim 1, wherein presenting valid location selections includes providing toggle controls for finishing options having a location fixed relative to other selected finishing options.

5. The method for concurrent programming utilizing a graphical user interface according to claim 1, wherein providing a dynamic graphic comprises:

composing a dynamic graphic of the job with said valid finishing option selections applied, wherein said dynamic graphic is in the form of a mimic; and revising the display on the user interface to include said mimic.

6. The method for concurrent programming utilizing a graphical user interface according to claim 1, wherein presenting available job feature selection options on the graphical user interface includes displaying a listing to enable a user to select at least one member from the group consisting of applying no finishing options, applying mutually exclusive selections, and applying multiple finishing operation capability.

7. A document production device utilizing a graphical user interface to program document finishing operations, wherein the graphical user interface causes the document production device to perform method steps for concurrent programming of document finishing operations to a single production job, the method comprising:

- presenting options for the selection of job properties or queue properties on the user interface, wherein said queue properties include default values for a virtual document device to which the job will be submitted, and wherein said job properties include job finishing selection options;
- presenting available said job finishing selection options on a graphical user interface, wherein said job finishing selection options display only valid job finishing combinations;
- providing toggle controls on the graphical user interface for job finishing options whose operation is limited by previously selected job finishing options;
- presenting valid location selections for a first finishing option selection;
- providing a dynamic graphic to illustrate an application of said first finishing option selection for a completed document;
- checking against rules controlling finishing option combinations;
- applying said rules to said first finishing option selection to determine which valid finishing options are available as second finishing option selections;
- presenting said valid second finishing option selections on said user interface;
- presenting valid location selections for said second finishing option selection to be applied to said completed document;
- applying said rules to said second finishing option selection to determine which valid finishing options are available as further finishing option selections;
- providing a dynamic graphic to illustrate the application of said first finishing option selection and said second finishing option selection on the completed document; and
- repeating presenting valid further finishing option selections on said user interface, presenting valid location selections for said further finishing options selections, applying said rules, and providing a dynamic graphic until all finishing selections have been completed.

* * * * *